G. C. STEVENS & J. F. STEVENS.

Improvement in Turbine Water-Wheels.

No. 4,987. Reissued July 16, 1872.

Witnesses:

Chas. Nida

N. A. Graham

Inventor:

G. C. Stevens

J. F. Stevens

Attorneys.

A.M. PHOTO-LITHOGRAPHIC CO. N.Y. (OSBORNE'S PROCESS.)

UNITED STATES PATENT OFFICE.

GEORGE C. STEVENS AND JOSIAH F. STEVENS, OF AYER, MASSACHUSETTS.

IMPROVEMENT IN TURBINE WATER-WHEELS.

Specification forming part of Letters Patent No. 90,204, dated May 18, 1869; reissue No. 4,987, dated July 16, 1872.

Specification describing a new and useful Improvement in Turbine Water-Wheels, invented by GEORGE C. STEVENS and JOSIAH F. STEVENS, of Ayer, in the county of Middlesex and State of Massachusetts.

Figure 1:
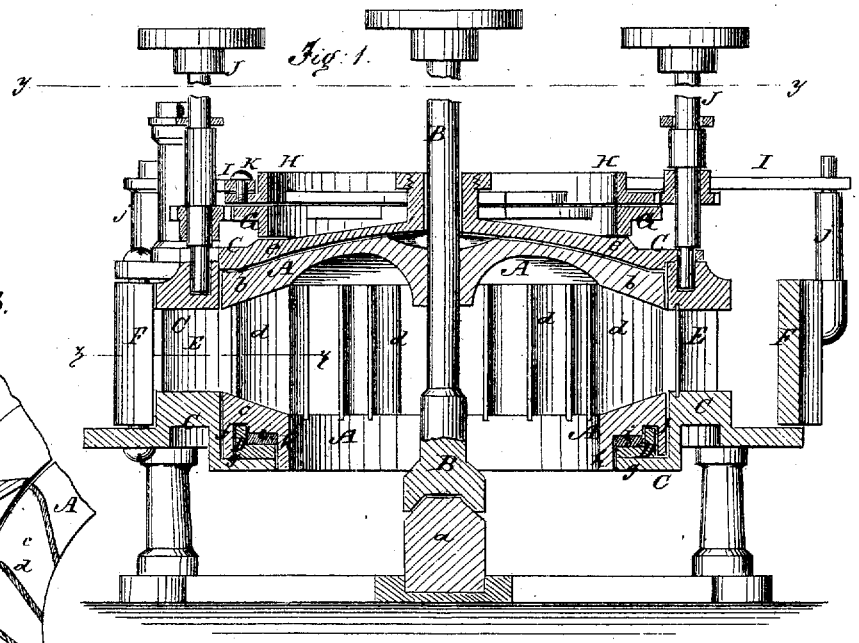
Figure 3:
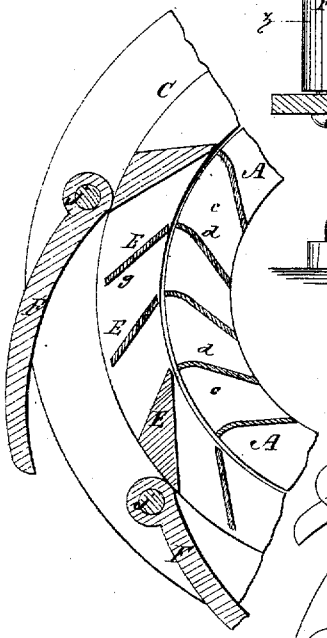
Figure 2:
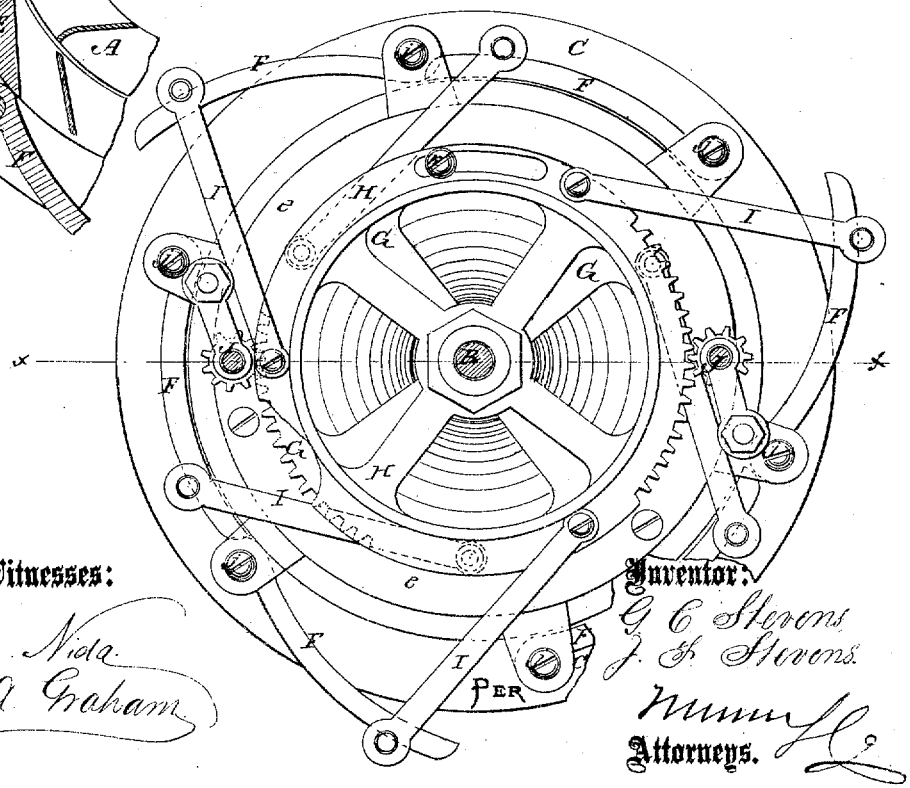

Figure 1 represents a vertical central section of our improved water-wheel, the plane of section being indicated by the line *x x*, Fig. 2. Fig. 2 is a top view, partly in section, of the same, the line *y y*, Fig. 1, indicating the plane of section. Fig. 3 is a detail horizontal section of the same on the line *z z*, Fig. 1.

Similar letters of reference indicate corresponding parts.

This invention has for its object to so connect the gates of a water-wheel with the mechanism for setting them that certain of the entire number of gates on one wheel can be opened while the remainder are closed, or that several of the gates can be opened more than others—not singly, however, but in certain sets, the members of each set being equally distributed around the circumference of the wheel. In adjusting the power or performance of a wheel to a smaller head of water than that to which the wheel, when in full force, is adapted, we have ascertained it to be more advantageous to open some of the gates and leave the others shut than to open all to a lesser degree. For, on our plan, the full head of a small volume of water is in a few courses directed against the wheel and exerts its entire power instead of being, as hitherto, subdivided into numerous small impotent jets or streamlets, whose small power is to a great extent absorbed by frictional contact with the numerous gates and chutes. In this feature of our invention we do, however, not desire it to be understood as claiming to have invented the individual adjustment of each gate independent of all other gates, which we know to have been done before, and which we know to be of little value in turbines, inasmuch as it is apt to counteract the balance of the wheel by directing a stronger stream against one side or part thereof than against the other. On the contrary, our invention consists in connecting several of the gates of the water-wheel into sets, each set being adjustable independent of the other set or sets, though, if required, all the sets may be simultaneously opened or closed. Our invention also consists in a new manner of shaping the top and bottom plates of the wheel so as to enlarge the space between them toward the center in order to facilitate the discharge of water. Finally, the invention consists in the arrangement of guide-chutes between the wheel and gates, as hereinafter more fully described.

A represents the water-wheel, fitted round a vertical shaft, B, which rests on a fixed step, *a*, and works in suitable journals. The wheel consists of the upper circular plate *b* of the lower annular plate *c* and of the buckets *d d* between them. The plates *b* and *c* are thickest at their edges, as shown, to produce an opening between them, which is wider on the inner and narrower on the outer part. This is to allow the water a free escape after doing its work and to prevent friction. The buckets are of ordinary or suitable construction. The wheel is fitted under the crown-plate *e* of a case or shell, C, and rests with its lower plate *f* upon the annular lower plate *g* of said case or shell, a downward-projecting flange, *h*, of the wheel working inside of the edge of said plate *g*, as shown. In the case C is formed, around the wheel A, a series of stationary guide-plates or chutes, E E, which serve to conduct the water in a certain required angle against the buckets of the wheel. This is best illustrated in Fig. 3. F F are the swinging gates. They are pivoted to the case C by means of pins *j*, as indicated in the drawing, or otherwise, and are swung more or less open by suitable mechanism. Each gate is large enough to control at least one passage between the chute-plates E, or two, three, or more of them. It will be seen that by this arrangement of the stationary chutes between the wheel and the gates the water is always carried at the same angle against the buckets of the wheel whatever may be the position of the gates or the quantity of the water introduced. That part of our invention which relates to the application of the stationary chutes between the gates and the wheel is entirely independent of any form of wheel or mode of operating the gates, and of packing-rings or other devices. Around the shaft B are, above the case C, arranged two or more wheels or rings, G H, each of which is, by means of arms I I, connected with the outer ends of some of the gates, so that if, for example, six gates are arranged, each ring may be connected with three of them, as in Fig. 2. When, then, one of the rings is turned the gates with which it is connected will be more or less opened or closed, while the other gates remain unmoved. Each ring, G H, is connected with an upright shaft, J, or other mechanism by which it can be turned. From the lower ring G projects a pin, *k*, through a slot in the next ring above H. This pin *k* connects the rings G H, so that they will, when the pin reaches the end of the slot in H, both move simultaneously whenever it is desired to move all the gates connected with such rings at once. When G H are wheels they may turn directly on the shaft B; but when they are rings they can work around a flange or friction-rollers.

By this arrangement we can employ any number of rings and slots, and work any portion of the gates, leaving the others shut, and can obtain as much speed with some of the gates drawn as with all less drawn.

The drawing shows the two turning-shafts J on different parts of the wheel, but they may be placed close together, if desired, or one only may be used, their respective positions and peculiar arrangement being merely a matter of convenience. By connecting the rings G H with the pin *k* they are really united into one wheel or ring, of which one part adjusts one set of gates before the other set or sets are similarly acted upon. For, instead of two, only one, or three, or more such rings or wheels may be used.

Having thus described our invention, we claim as new and desire to secure by Letters Patent—

1. The gates of a turbine-wheel arranged in separately-adjustable sets, and combined with general setting mechanism, as described, so that the sets of gates may be opened independently or all together.

2. The top and bottom plates correspondingly constructed, as described, to enlarge the space toward the center, and thus facilitate the discharge of dead water.

3. The arrangement of the guide-chutes between the wheel and the gates, as and for the purpose set forth.

GEORGE C. STEVENS.
JOSIAH F. STEVENS.

Witnesses:
E. H. HAYWARD,
JOHN H. TURNER.